(12) United States Patent
Kuppusamy et al.

(10) Patent No.: US 8,091,020 B2
(45) Date of Patent: Jan. 3, 2012

(54) SYSTEM AND METHOD FOR UPDATING A TABLE-OF-CONTENTS IN A FRAMESET

(75) Inventors: Ashok Kuppusamy, Bellevue, WA (US); James N. Helfrich, Redmond, WA (US); John David Griffin, Seattle, WA (US); Joe K. Yap, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 37 days.

(21) Appl. No.: 10/870,638

(22) Filed: Jun. 17, 2004

(65) Prior Publication Data
US 2005/0010865 A1    Jan. 13, 2005

Related U.S. Application Data

(63) Continuation of application No. 09/103,414, filed on Jun. 24, 1998, now Pat. No. 6,769,096.

(51) Int. Cl.
*G06F 17/30* (2006.01)
*G06F 3/048* (2006.01)

(52) U.S. Cl. ......... 715/240; 715/208; 715/234; 715/241

(58) Field of Classification Search .................. 715/513, 715/804, 531, 523, 208, 234, 240, 241; 707/4
See application file for complete search history.

(56) References Cited

U.S. PATENT DOCUMENTS

| | | | | |
|---|---|---|---|---|
| 5,761,668 A | * | 6/1998 | Adamchick | 707/101 |
| 5,848,410 A | * | 12/1998 | Walls et al. | 707/4 |
| 5,893,916 A | * | 4/1999 | Dooley | 715/523 |
| 5,963,205 A | * | 10/1999 | Sotomayor | 715/531 |
| 7,770,123 B1 | * | 8/2010 | Meyer et al. | 715/760 |

OTHER PUBLICATIONS

Michael White and David E. Caldwell, "Cogent help: NLG meets SE in a tool for authoring dynamically generated on-line help", 1997, CoGenTex Inc, pp. 257-264.*
Laura Lemay and Brian K. Murphy, "Creating Commercial Web Pages", 1996, Sams.net Publishing, First Edition, pp. 1, 2, 4 and 5.*
Artur Crespo et al, "Web Writer: A Browser-Based Editor for Constructing Web Applications", May 10, 1996, pp. 1-5.*
Michael Priestley, "Navigation Issues in Hypertext: documenting complex hierarchies with HTML frames", 1997, pp. 223-235.*
Laura Lemay and Arman Danesh, "Teach Yourself Web Publishing with HTML in a Week", 1997, Sams Publishing, pp. 353-354.*
Person et al, "Special Edition Using Microsoft Word 97", Dec. 16, 1996, Publisher: Que, pp. A1-A10, B1-B7, C1-C3, D1-D6.*

* cited by examiner

*Primary Examiner* — Stephen Hong
*Assistant Examiner* — Wilson Tsui
(74) *Attorney, Agent, or Firm* — Merchant & Gould

(57) ABSTRACT

A self-updating frameset having a target document in one frame and a Table-of-Contents (TOC) document in another frame hyperlinked to the target document. A reference document (RD) field is inserted into the TOC document to identify the target document as the target of the TOC. A TOC field in the TOC document scans the target document to identify selected headings as entries in the TOC document. When the selected headings are identified, the TOC field creates hyperlink entries in the TOC document, each hyperlink entry having a corresponding anchor at a selected heading in the target document. The hyperlink entries in the TOC document can be automatically updated each time the fields in the TOC document are recalculated.

25 Claims, 7 Drawing Sheets

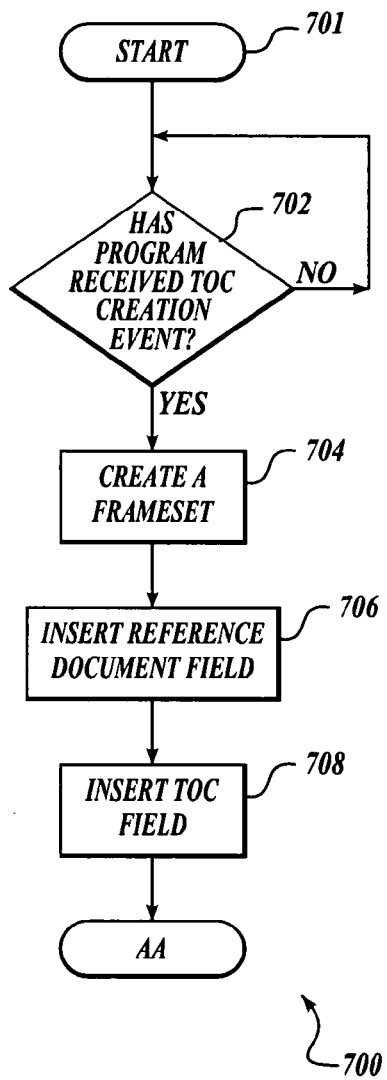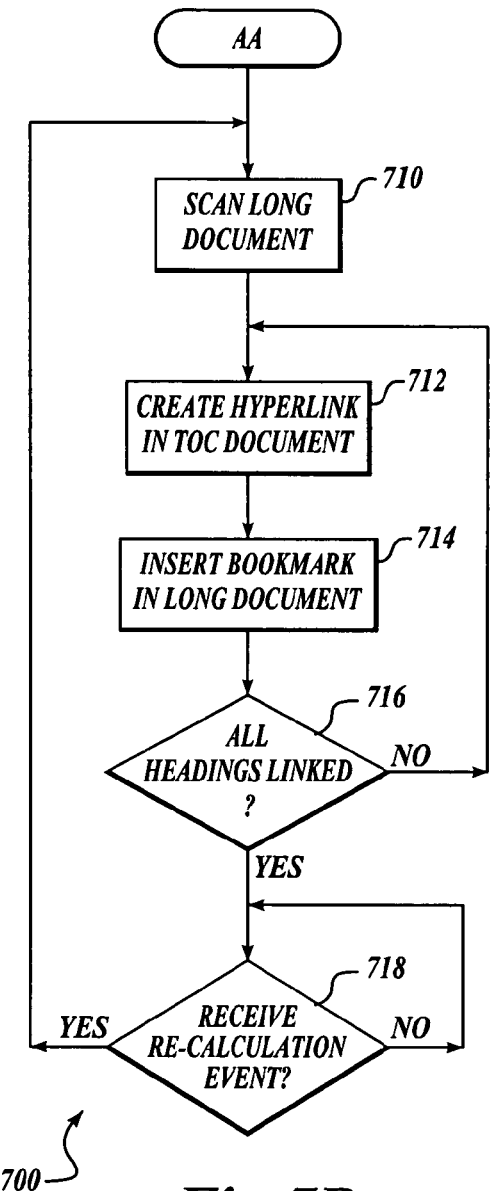
Fig. 7A
Fig. 7B

SYSTEM AND METHOD FOR UPDATING A TABLE-OF-CONTENTS IN A FRAMESET

This application is a continuation of application Ser. No. 09/103,414, filed Jun. 24, 1998, now U.S. Pat. No. 6,769,096, which application is incorporated herein by reference.

FIELD OF THE INVENTION

The present invention generally relates to HTML frameset creation programs. More particularly, the present invention relates to updating a table-of-contents in a first frame of a frameset, the table-of-contents hyperlinked to a target document in a second frame of the frameset.

BACKGROUND OF THE INVENTION

When viewing a document online, such as in a word processor or Internet browser, it is often difficult to navigate through sections of the document if the document is lengthy. Finding a particular passage of text or section by simply scrolling through the long document can be difficult and time consuming. It can be helpful to have a table-of-contents in a window beside the document to help navigate the document. The table-of-contents can be hyperlinked to selected sections of the document such that triggering a particular link in the table-of-contents moves the focus of the word processor or Internet browser to the desired section of the document. For this discussion, the term "hyperlinked" means an association between a "link" in a first ("source") document and an "anchor" in a second ("target") document. Triggering the link in the source document brings the screen of the target document containing the anchor into focus. For this discussion, the term "focus" relates to the active screen display available to the user for viewing.

From a typical user's perspective, existing mechanisms for creating a table-of-contents hyperlinked to a target document are flawed. For instance, word processors can create a table-of-contents hyperlinked to selected portions of the target document. However, existing word processors merely create a table-of-contents within the same document. Unfortunately, to view the table-of-contents and the target document side-by-side in a HyperText Markup Language ("HTML") frameset, the two should be in separate documents. For this discussion, the term "frameset" means a group of windows owned by a single software program module, where each window displays the contents of a different document. Existing word processors do not provide the ability to view the table-of-contents and the target document side-by-side in an HTML frameset, such as with an Internet browser. For that reason, the table-of-contents and target document cannot be easily opened by an Internet browser for online viewing.

Certain HTML editors can create an HTML frameset containing a target document in one frame and a table-of-contents document in a second frame, with the table-of-contents document hyperlinked to selected sections of the target document. This solution allows the table-of-contents and the target document to be viewed online over the Internet. However, maintaining the validity of the hyperlinks in the table-of-contents is a tedious and time-consuming process for an evolving document. For HTML editors, a change made to the target document cannot be reflected in the table-of-contents document without manually editing the table-of-contents document.

Accordingly, a need exists for a mechanism to create an HTML frameset having a target document in one frame and a separate table-of-contents document in another frame, with the table-of-contents document hyperlinked to selected sections of the target document. Moreover, the mechanism should be self-updating such that a change in a selected section of the target document will be reflected in the table-of-contents document without the need to manually edit the hyperlinks in the table-of-contents document.

SUMMARY OF THE INVENTION

The present invention meets the above-described needs by providing the ability to create a self-updating frameset having a table-of-contents ("TOC") document in one frame hyperlinked to a target document in another frame. The term "frameset" refers to the creation of two or more independent windows with each window simultaneously displaying a different document. The target document can be displayed in one frame beside the TOC document in another frame. In this way, a user has access to a portion of both documents simultaneously.

The TOC document can be "hyperlinked" to selected parts of the target document to aid in the navigation of the target document. Hyperlink entries associated with selected parts of the target document can be created in the TOC document. The selected parts of the target document can be headings distributed throughout the target document which introduce various sections of the target document. Triggering a hyperlink entry in the TOC document in one frame results in the target document scrolling until a heading associated with the hyperlink entry is visible in the other frame. Accordingly, the user can quickly scroll the target document forward or backward to a desired section by triggering a link in the TOC document corresponding to a heading at the desired section.

The TOC document is separate from the target document and may be formatted in a manner similar to any other self-contained document. The TOC document is configured such that changes in the target document are reflected without the user having to manually edit the TOC document. For example, in response to an update event, such as the opening of the TOC document, the hyperlink entries in the TOC document are recreated. Therefore, changes made to the selected parts of the target document are reflected in the TOC document without the need to manually edit the hyperlink entries in the TOC document.

In one aspect of the present invention, a self-updating frameset includes a TOC document hyperlinked to a target document. The frameset contains two frames, a first frame including the TOC document and a second frame including the target document. Both the TOC document and the target document are visible in the frameset. This allows a user to simultaneously view both the TOC document and the target document.

The TOC document typically includes a set of entries referencing subject matter in the target document. For example, the entry may be a hyperlink entry having a link to an anchor in the target document. For this discussion, the term "link" refers to a specially activated word, phrase or image in a source document that, when triggered, transfers the focus to the anchor in the target document or in another part of the source document. The term "anchor" refers to a special code or label embedded within a document that identifies the point to which focus will be transferred if the corresponding link is triggered.

The link portion of an entry in the TOC document is receptive to a triggering event, such as a mouse click, and the corresponding anchor is maintained in the target document. Once a link is triggered, the computer system responds by scrolling the target document in the frameset to the anchor.

The anchor is typically embedded within the target document near a preselected heading in the target document. Accordingly, triggering the link in the TOC document in one frame causes the target document in another frame to scroll until the preselected heading of the target document is in view.

The hyperlink entry can be automatically updated to reflect a change to the target document. At identified times, the entry in the TOC document is recreated to correspond to the preselected heading. If the preselected heading has changed between the time the entry was first created and the time the entry is recreated, then the change is automatically reflected in the TOC document in response to an update task conducted at an identified time.

In another aspect of the present invention, a created frameset includes a TOC document in a first frame and a target document in a second frame. The target document contains one or more preselected headings indicating a beginning of corresponding sections in the target document. The target document can be scanned to identify each preselected heading. A hyperlink entry is created in the TOC document in response to identifying a preselected heading in the target document. As part of creating the hyperlink entry, an anchor is inserted into the target document at a location proximate to the preselected heading. Triggering the link portion of a hyperlink entry in the TOC document results in scrolling the target document until the corresponding anchor is visible.

The TOC document may be configured to recreate itself in response to a predetermined event, for instance, each time the TOC document is opened. These events are termed "update" events. In response to an update event, the target document is scanned to identify each preselected heading. In response to locating a preselected heading, a corresponding hyperlink entry is created in the TOC document. In this manner, a change made to the preselected heading will be reflected in the TOC document each time an update event occurs.

The present invention overcomes the disadvantages in the prior art by providing the ability to create an HTML frameset with the TOC document in one frame hyperlinked to the target document in another frame. In this way, the frameset created by the present invention is readable by both word processing programs and Internet browsers. This aspect overcomes the current limitation with creating a TOC within the target document, which cannot be easily transformed to an HTML frameset readable by an Internet browser. Moreover, the frameset is self-updating, thereby eliminating the need to manually maintain the hyperlinks in the TOC document based on a change in the target document.

Other features, aspects, and advantages of the present invention will become apparent upon reading the following detailed description of exemplary embodiments, taken in conjunction with the drawings and the claims.

BRIEF DESCRIPTION OF THE DRAWINGS

FIGS. 7A and 7B are flow diagrams illustrating steps in more particularity performed by an exemplary embodiment of the present invention to create a self-updating frameset with a TOC document hyperlinked to sections of a target document.

DETAILED DESCRIPTION OF THE EMBODIMENTS

The present invention is directed to a self-updating frameset with a table-of-contents (TOC) document having TOC entries hyperlinked to preselected portions of a target document. In brief, the present invention can create a frameset containing a target document hyperlinked to a TOC document. A reference document field is inserted into the TOC document to identify which document is associated with the TOC document, i.e., the target document. A TOC field is also inserted into the TOC document to create TOC entries. The TOC field scans the target document to identify preselected headings, which introduce different sections of the target document. A TOC entry is created in the TOC document corresponding to each identified heading of the target document. A TOC entry is created by inserting a link in the TOC document corresponding to an anchor, such as a bookmark at a heading, in the target document. When the link in the TOC document is triggered, the target document scrolls either forward or backward until the anchor is in the active window of the target document. Accordingly, the user can easily navigate through the target document by triggering links in the TOC document corresponding to the heading which the user desires to be in the active window of the target document.

Figure 1:
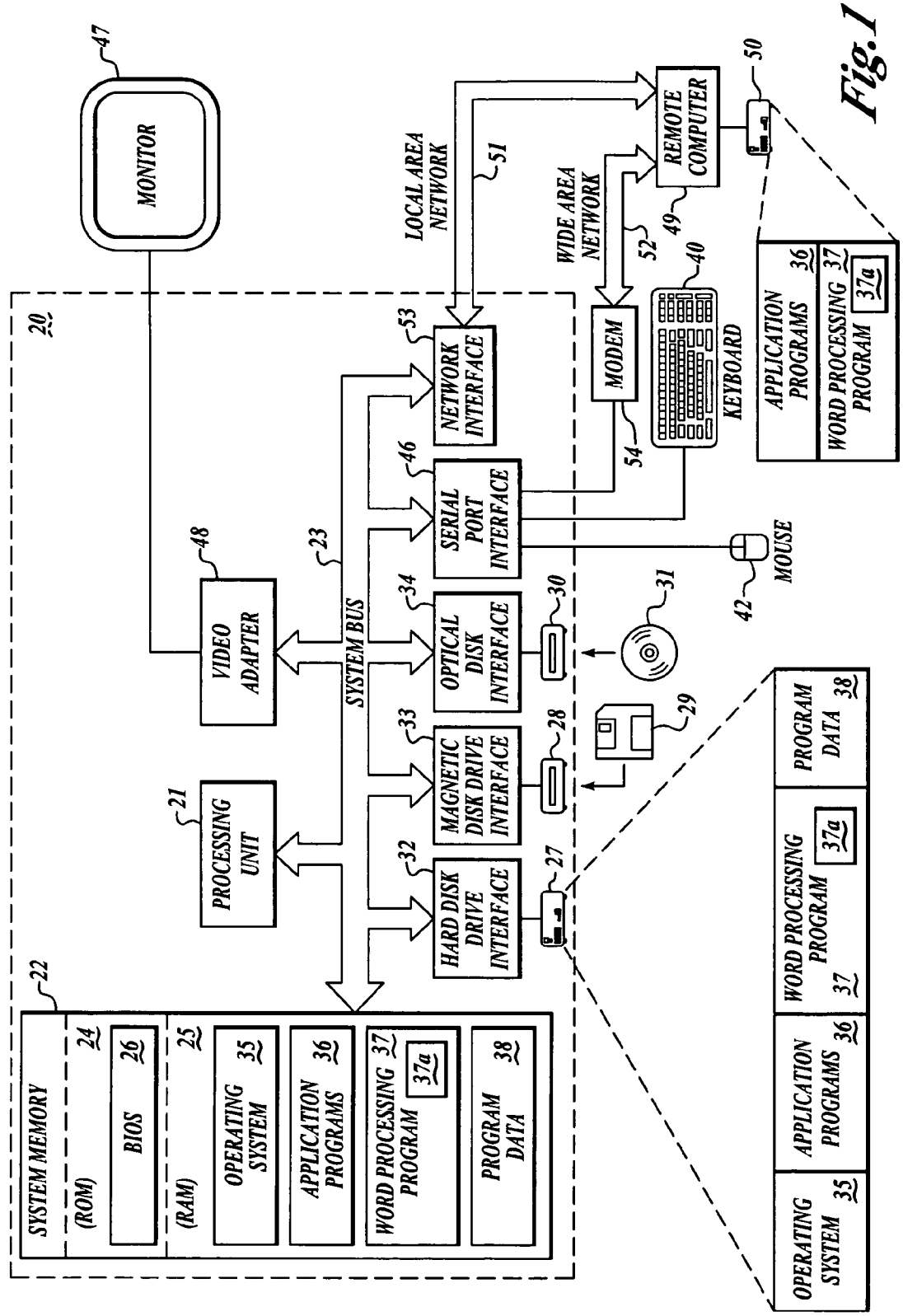
FIG. 1 is a block diagram of a computer that provides a portion of the operating environment for an exemplary embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules, such as a word processing program 37, and program data 38. The word processing program 37 may include a TOC generation software module 37a in accordance with an exemplary embodiment of the present invention. In this embodiment, the invention is incorporated in a word processing application program entitled "MICROSOFT WORD," marketed by Microsoft Corporation of Redmond, Wash. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
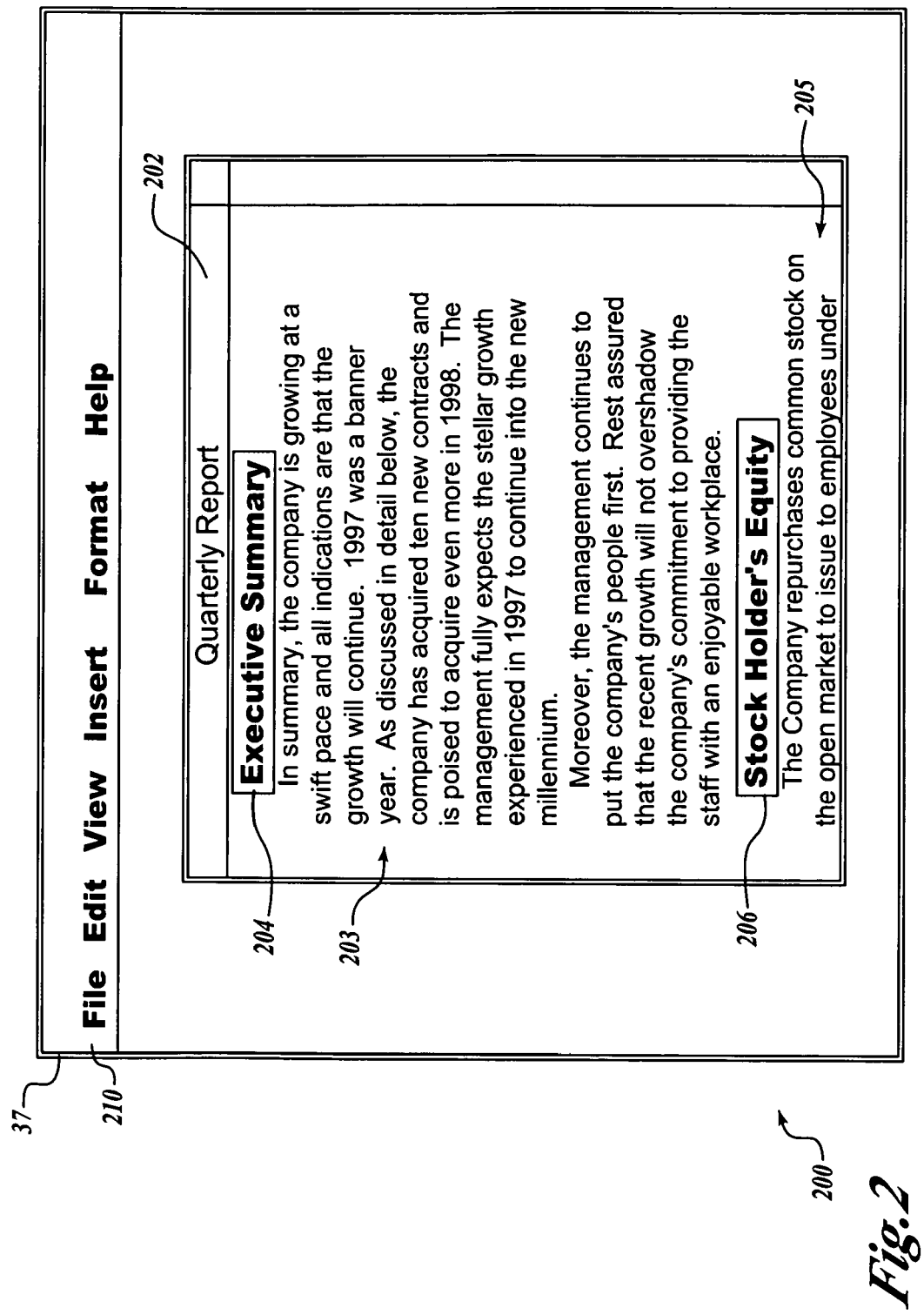
FIG. 2 illustrates a target document present within a window of a word processing program in accordance with an exemplary embodiment of the present invention.

FIGS. 2-5 illustrate an exemplary embodiment of the present invention by presenting a sequence of simulated display screens of a word processing program, such as the word processing program 37. FIG. 2 is an illustration of a screen display 200 of an exemplary computer program for creating documents, such as word processing program 37. Visible in the screen display 200 is a target document 202, entitled "Quarterly Report," within a window of the word processing program 37. The target document 202 is divided into several sections to which a user desires quick access. For this discussion, the term "section" means a passage of text and/or graphical images which is differentiated from other passages in the same document. A section may be a few paragraphs or several pages. For example, visible in the screen display 200 is an executive summary section 203 and a portion of a section discussing stock holders' equity 205. Although only two sections are visible in the screen display 200, the target document 202 may be lengthy and contain several sections.

Each of the several sections is preceded by a heading. Headings are generally short passages of text used to introduce the different sections of the target document 202. For instance, in the screen display 200, a Heading 204 introduces the executive summary section 203 of the target document 202, and a Heading 206 introduces a section discussing stock holders' equity 205. Although only two headings are visible in the screen display 200 of FIG. 2, the target document 202 may contain multiple headings introducing the various sections.

To prepare the target document 202, the headings may be selected by assigning a particular "style" to the heading text. Those skilled in the art will appreciate that a style is a configuration of textual format selections, such as font size, typeface, line spacing, or paragraph justification, which can be applied to text in a word processing document. For instance, the Heading 204 and the Heading 206 may each be selected by assigning a "Header 1" style to each heading. Assigning the style to the headings may involve highlighting the text of the headings and making a style choice from a menu bar 210. For example, in the screen display 200, the Heading 204 and the Heading 206 are each highlighted (illustrated by the darkened rectangles enclosing the headings). At this point, by making a style choice from the menu bar 210, a style may be applied to both headings. The style distinguishes the headings from other text in the target document 202. Once the headings are selected, the TOC document may be created. For example, in a preferred embodiment, the user may trigger a TOC creation event by selecting a "TOC in Frameset" option (not shown) from the menu bar 210.

Figure 3:
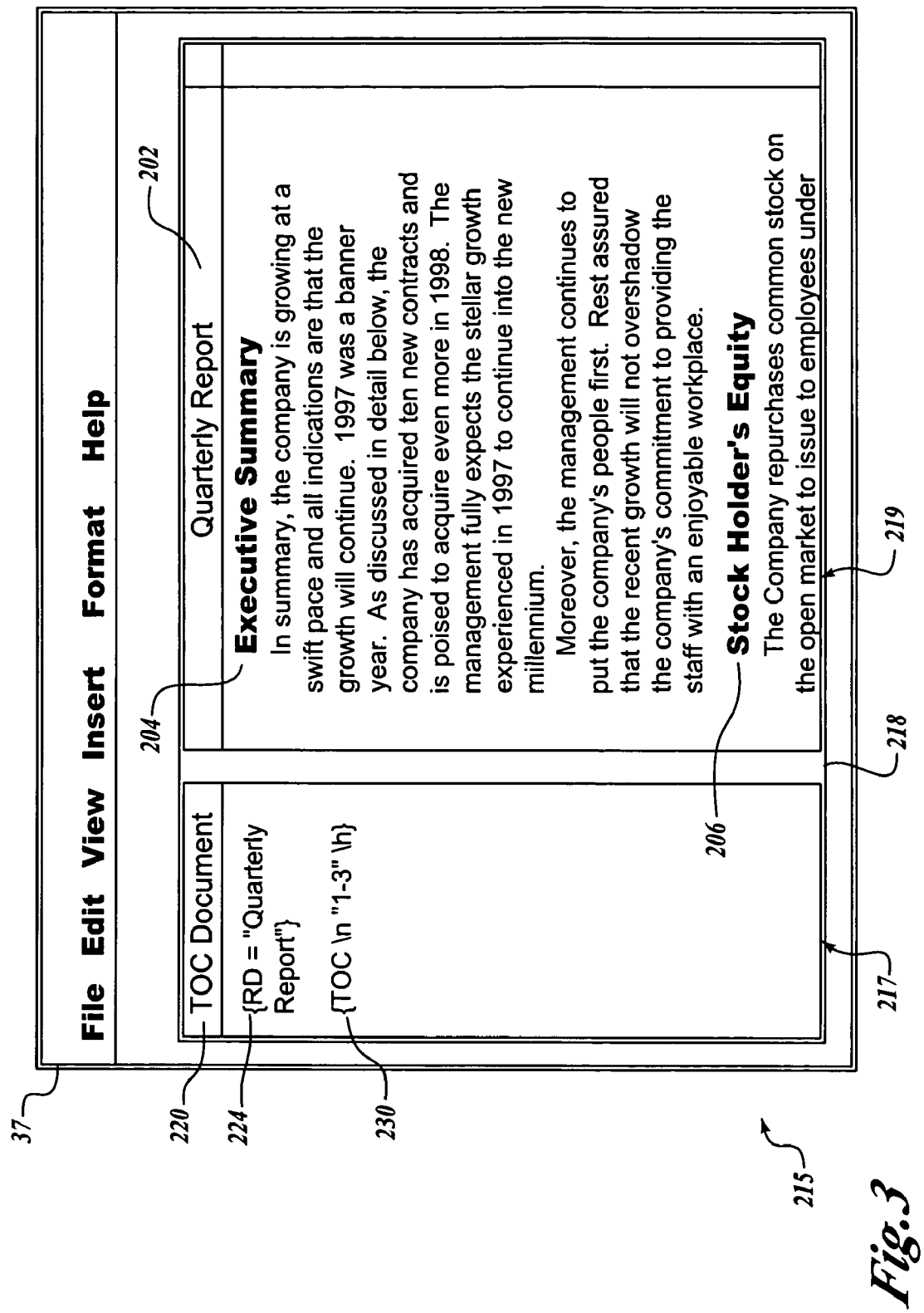
FIG. 3 illustrates a frameset, including the target document illustrated in FIG. 2 in a first frame and a TOC document in a second frame, present within a word processing program in accordance with an exemplary embodiment of the present invention.

FIG. 3 presents a screen display 215 having a frameset 218 that is created in response to a TOC creation event. In particular, the word processing program 37, in response to the user's input, creates a TOC document 220 and a frameset 218 containing the target document 202 and the TOC document 220. For this discussion, the term "frameset" relates to the creation of two or more independent windows with each window simultaneously displaying a different document. Framesets are common in the field of HTML documents and are often used to subdivide a main display window of a computer software program, such as the word processing program 37 or an Internet browser, in order to browse two or more documents simultaneously. The user may access any document displayed in a visible frame.

In the screen display 215, the frameset 218 includes a left frame 217 and a right frame 219 positioned side-by-side and simultaneously visible. The left frame 217 is occupied by the newly-created TOC document 220, and the right frame 219 is occupied by the target document 202. Those skilled in the art will appreciate that the frameset 218 may include a frameset document (not shown) which defines the parameters of the frameset 218, such as how many frames appear and what documents occupy each frame.

Once the frameset 218 is created, two fields are preferably added to the TOC document 220. Before discussing the two fields, a brief discussion of the technology of "fields" is warranted. Those skilled in the art will understand that "fields" may be used to perform functions or to automate tasks in a word processing program. For this discussion, the term "fields" refers to the technology of inserting codes or labels in computer documents which, when calculated, perform pre-defined functions. The field is calculated for the first time when the field is instantiated. The field can be recalculated at various intervals, which may be user selectable. One common example is a "date field" which may be inserted into a computer document and displays the current date each time the field is calculated. A computer document can be configured to recalculate its fields each time it is opened. Consequently, each time the computer document is opened, the date field displays the current date. For the purpose of this discussion, the term "update event" means the occurrence of an event that causes the fields of a document to be recalculated. Examples of possible update events are the opening of the document or the pressing of a particular key combination on a computer keyboard, such as the keyboard 40. The use of fields within electronic documents is known in the art.

A Reference Document ("RD") field 224 defines the "reference document" for the TOC document 220. The reference document is the document with which the TOC document 220 is associated, in this instance, the target document 202. When the TOC creation event occurs, the RD field 224 is inserted into the TOC document 220 and configured to reflect the name of the target document 202. For the representative example shown in FIG. 3, the RD field 224 identifies "Quarterly Report." When instantiated, and each time the field is recalculated, the RD field 224 sets a pointer in memory, such as the memory 25, to the target document 202.

The second field inserted in the TOC document 220 is a TOC field 230. When instantiated, the TOC field 230 performs several tasks. First, the TOC field 230 scans the target document 202 (identified by the pointer set by the RD field 224) to identify the headings of the target document 202. The TOC field 230 locates the portions of the target document 202 which have been assigned a particular style, such as the Header 1 style. In the disclosed embodiment, the Heading 204 and the Heading 206 have been assigned that particular style and are, therefore, identified as entries for the TOC document 220. As mentioned, many other headings may exist in the target document 202, and each heading bearing the particular style is identified as an entry for the TOC. It should be noted that the RD field 224 and the TOC field 230 are visible in FIG. 3 for illustrative purposes only, and in operation the fields—may be hidden such that they operate in the background without the user's knowledge.

Figure 4:
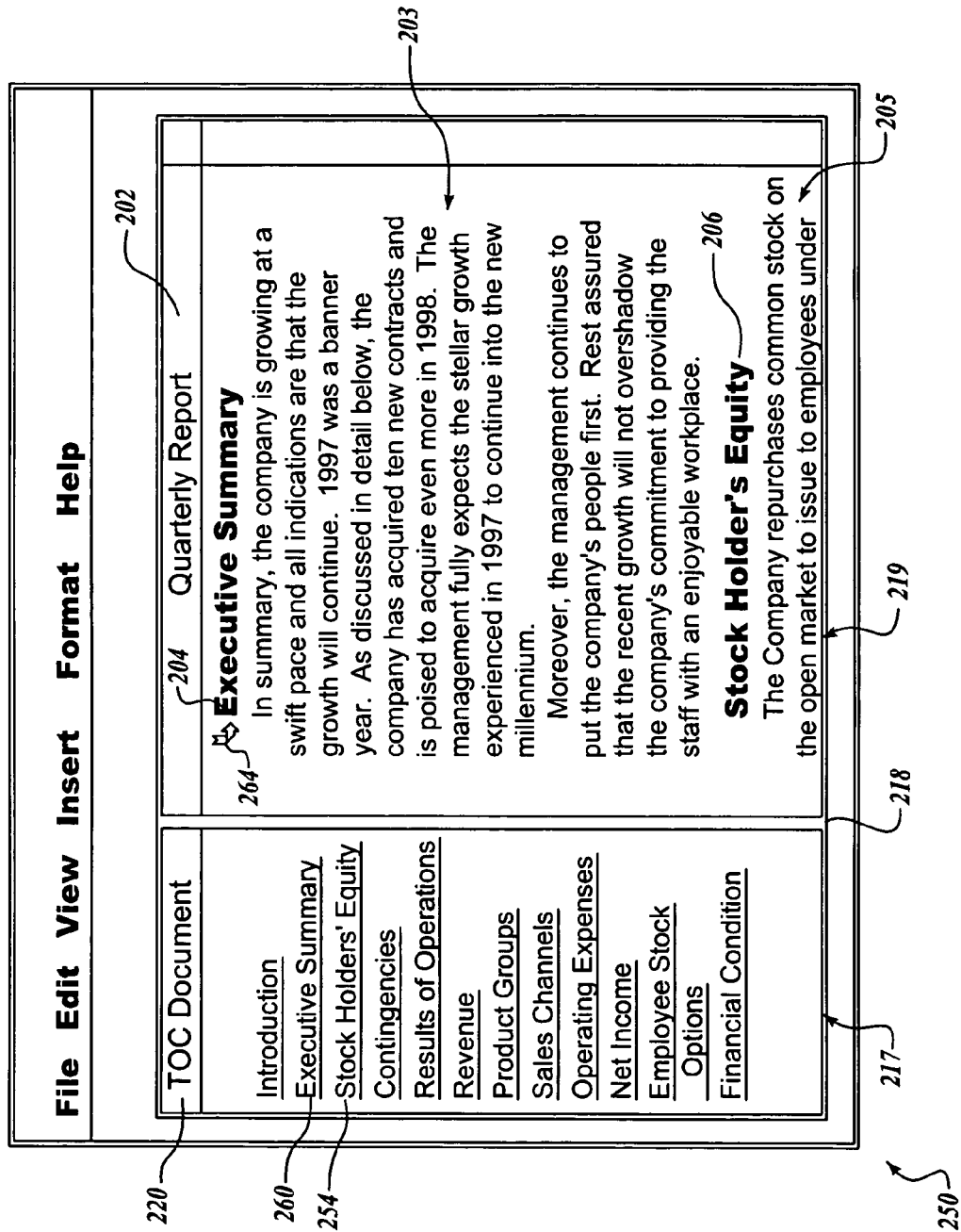
FIG. 4 illustrates the frameset of FIG. 3 with hyperlink entries created in the TOC document, and an exploded view of a portion of the target document detailing a heading in the target document, in accordance with an exemplary embodiment of the present invention.

FIG. 4 presents a screen display 250 illustrating the creation of entries in the TOC document 220. Shown is the frameset 218 having the TOC document 220 visible in the left frame 217 and the target document 202 simultaneously visible in the right frame 219. Visible within the TOC document 220 is a series of entries, such as Entry 260 and Entry 254. The creation and function of those entries is discussed below. An exploded view 251 illustrates in larger dimension a part of the target document 202 near the Heading 204. A bookmark 264 is shown in the exploded view 251 at the Heading 204. Although the bookmark 264 is visible in the exploded view 251, those skilled in the art will appreciate that the bookmark 264 may be an invisible code or label which is not displayed in the target document 202. The bookmark is also discussed in greater detail below.

Visible in the target document 202 are an executive summary section 203 and a section discussing stock holders' equity 205. Preceding those sections is the Heading 204 and the Heading 206, respectively. Those skilled in the art will appreciate that although only those two sections are visible in the right frame 219, the target document 202 may be lengthy and contain several sections. In order to display other sections, it is necessary to scroll the target document 202 until the desired section is visible in the right frame 219.

The creation of the entries in the TOC document 220 occurs once the selected headings are identified as discussed above with respect to FIG. 3. A hyperlink entry is created in the TOC document 220 for each selected heading. As mentioned above, a hyperlink has two components: a link and an anchor. The anchor is discussed in greater detail below. The link is a specially activated word, phrase or image in the TOC document 220 that, when triggered, transfers the focus to the anchor in the target document 202. In the disclosed embodiment, the entries, such as Entry 260 and Entry 254, in the TOC document 220 are visual representations of the links corresponding to the entries. Accordingly, for simplicity of discussion, the terms "entry" and "link" may be used interchangeably. Therefore, each entry in the TOC document 220 may be a link to a corresponding anchor in the target document 202.

Those skilled in the art will appreciate that the link can be created by inserting a code at each entry which enables the link to cause the focus to transfer to the anchor in the target document. For example, a code inserted at Entry 260, corresponding to the Heading 204, may take the form:

<a href="quarterly_report.html#Executive Summary">Executive Summary</a> which results in a link having "Executive Summary" displayed in underlined text in the TOC document 220. The text of the entry may be displayed in a different color than ordinary text, or the text of the entry may be underlined to identify its linking function. In the screen display 250, the links are displayed as underlined text. Alternatively, the link may be a graphical image rather than text. When the link at Entry 260 is triggered, the focus of the target document 202 will shift to an anchor located at "quarterly_report.html#Executive Summary" (discussed below).

The TOC field 230 continues locating the selected headings in the target document 202 and creating hyperlink entries in the TOC document 220 until all the selected headings have corresponding hyperlink entries, such as Entry 254, in the TOC document 220. Anchors for each link then can be inserted in the target document 202. The anchor may be an invisible code labeling a particular point in the target document. For each hyperlink entry, a second code, often referred to in the art as a "bookmark," is inserted in the target document 202 at the heading associated with the hyperlink entry. The bookmark is the anchor for the hyperlink entry. Therefore, the Entry 260 includes a link having an anchor at bookmark 264.

The exploded view 251 illustrates in larger dimension the area of the target document 202 near the Heading 204. The bookmark 264 functions to label the particular location where the bookmark 264 is inserted. The bookmark 264 may be inserted in the target document 202 near the Heading 204 to label that-location in the target document 202. Accordingly, the Entry 260 corresponding to the bookmark 264 is associated with the location near the Heading 204. Although the bookmark 264 is depicted graphically in the exploded view 251, those skilled in the art will appreciate that the bookmark 264 may be hidden. For example, the bookmark may be a code inserted near Heading 204, corresponding to Entry 260, and take the form:

<a name="Executive Summary"/a> which identifies Heading 204 as the point in the target document 202 associated with the Entry 260. Inserting bookmarks at headings is repeated for each entry until bookmarks have been inserted in the target document 202 corresponding to each entry in the TOC document 220. When all of the bookmarks are inserted in the target document 202, the TOC field execution is complete.

Figure 5:
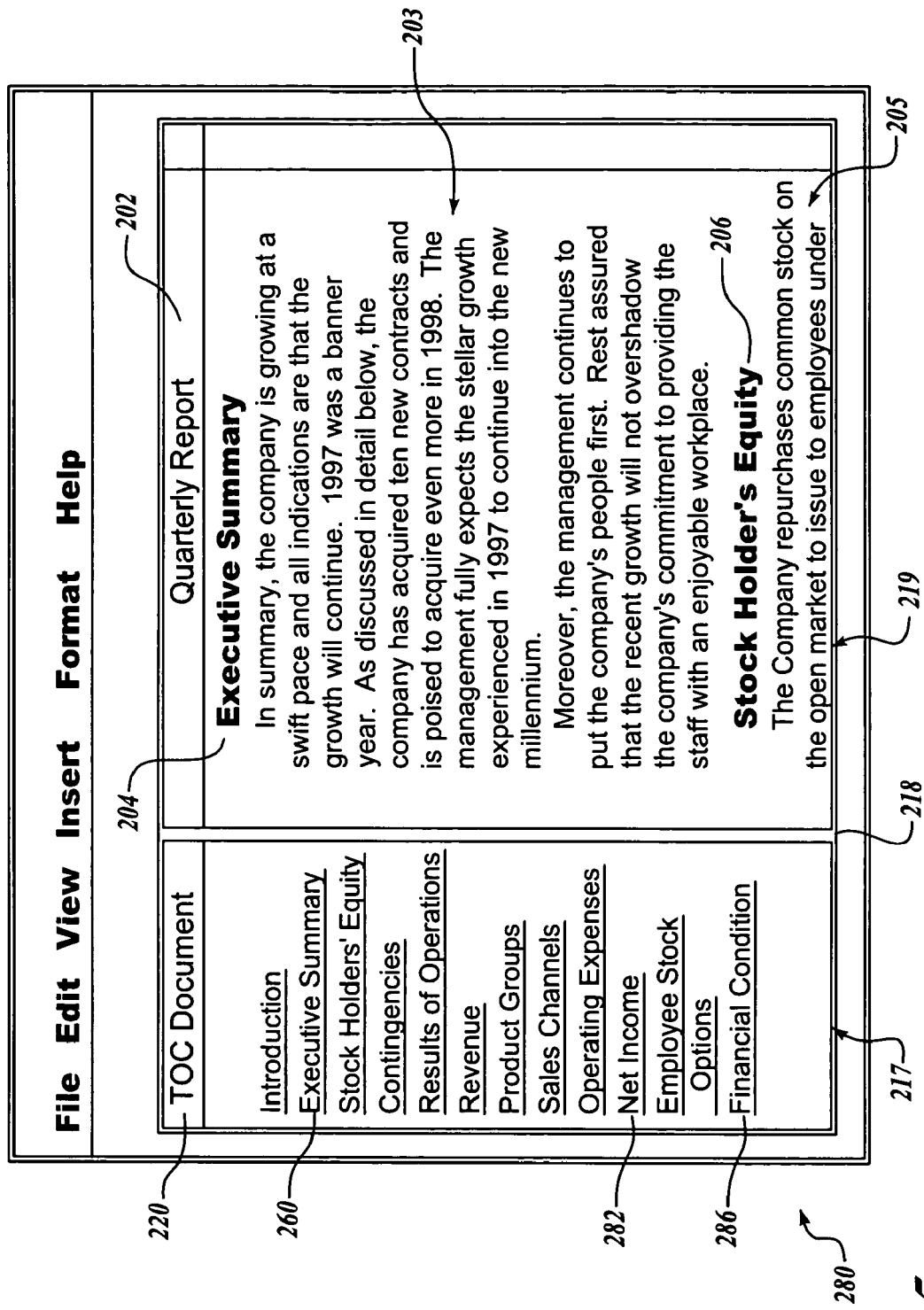
FIG. 5 illustrates the completed, self-updating frameset of FIG. 4 providing visual access to the hyperlink entries in the TOC document corresponding to headings in the target document such that triggering the entries allows easy navigation of the target document, in accordance with an exemplary embodiment of the present invention.

FIG. 5 is a screen display 280 illustrating the completed frameset 218. Visible in the screen display 280 is the TOC document 220 in the left frame 217 and the target document 202 in the right frame 219. Visible in the TOC document 220 is a series of entries, such as the Entry 260 and the Entry 282, created as discussed above with respect to FIG. 4. Accordingly, each of the entries corresponds to a heading preceding a section of the target document 202. In the screen display 280, only the executive summary section 203 and a portion of the section discussing stock holders' equity 205 are visible. The executive summary section 203 is preceded by the Heading 204, and the section discussing stock holders' equity 205 is preceded by the Heading 206. Although only those two sections are visible in the screen display 280, it will be apparent from the number of entries in the TOC document 220 that the target document 202 contains many sections which are not visible.

Each entry is functional to cause the target document 202 to scroll in the right frame 219 until the heading corresponding to the entry comes in to view. For example, a user may trigger an entry in the TOC document 220, such as Entry 260, which causes the target document 202 to scroll until the Heading 204 is visible in the right frame 219. Otherwise, the user may select any other entry and bring its corresponding heading in focus. For instance, if the user selects Entry 282, the target document 202 will scroll until the section discussing net income (not shown) is visible in the right frame 219. In this manner, the user may quickly navigate through the target document 202 by clicking on the several entries in the TOC document 220.

The TOC document 220 created is self-updating. In other words, when the fields in the TOC document 220 are recalculated, the entries in the TOC document 220 are updated. In this manner, changes in the target document 202, such as changes in the relative positions of the headings, the TOC document 220 reflects those changes without the need for manual maintenance of the TOC document 220 by the user. Moreover, if the text of the headings is modified, those changes are reflected in the TOC document 220 as well. For instance, the user may edit the text of the heading in the target document 202 corresponding to Entry 286 from "Financial Condition" to "Financial Position." Accordingly, the next time the fields in the TOC document 220 are recalculated, the TOC field 230 (FIG. 3) scans the target document 202 and automatically modifies Entry 286 to reflect the change. Those skilled in the art will understand that recalculating the fields may be performed manually, or in response to an update event. For example, the TOC document 220 can be configured to recalculate its fields each time it is opened or printed.

Once the frameset is created, the contents of both documents can be saved as HTML documents in an Internet browser-readable format. Saving documents in HTML language is known in the art of word processors. In this way, the frameset includes the target document and the TOC document hyperlinked to selected sections of the target document. The frameset itself also can be saved in HTML format, making it readable by Internet browsers. Accordingly, the HTML frameset can be updated without the need for manually editing the TOC document by recalculating the fields in the TOC document and resaving the frameset in HTML format.

Figure 6:
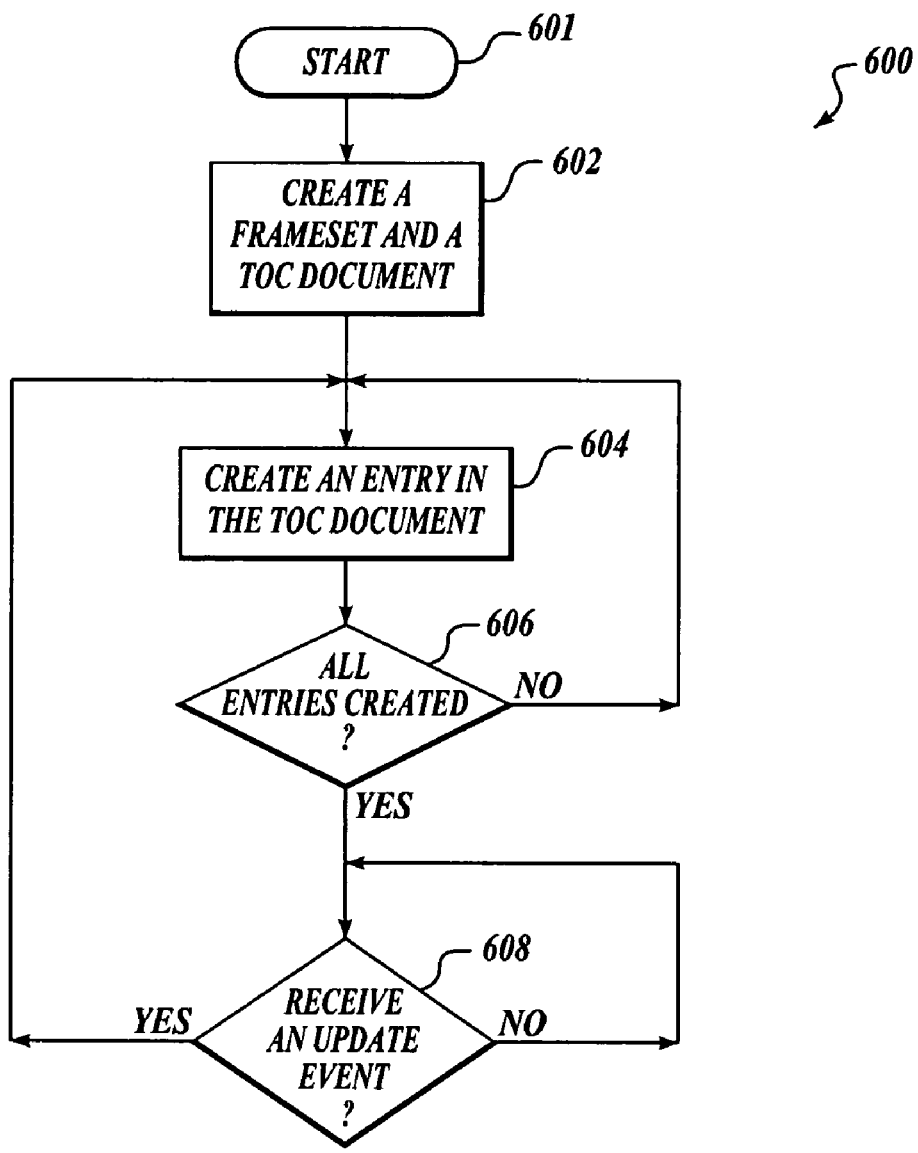
FIG. 6 is a flow diagram illustrating in general steps performed by an exemplary embodiment of the present invention to create a self-updating frameset with a TOC document hyperlinked to sections of a target document.

FIG. 6 is a logical flow diagram illustrating an overview of steps performed by an exemplary embodiment of the present invention to create a self-updating frameset with a TOC document hyperlinked to a target document. Turning now to the flow diagram 600, at starting step 601, a representative target document, such as the target document 202 illustrated above in FIG. 2, is created. The representative target document may be lengthy and partitioned into several sections. A heading may precede each of several sections. The heading may be a passage of text briefly describing the subject matter of the section introduced by the heading. Alternatively, the heading may be a graphical image. A word processing style, as described above with respect to FIG. 2, may be applied to identify the headings in the target document.

At block 602, a frameset and the TOC document are created. The frameset may contain two frames positioned adjacent to each other, as illustrated by the frameset 218 of FIG. 3. The TOC document occupies one frame in the frameset and the target document occupies another frame. In this way, the TOC document and the target document are visible side-by-side. Making the two documents simultaneously visible provides the user with quick access to both documents.

At block 604, an entry is created in the TOC document which corresponds to a heading in the target document. The creation of the entry includes inserting a link in the TOC document and inserting an associated anchor in the target document. The link may appear in the TOC document as a short passage of text, such as the text of the heading, or a graphical image. The link includes a special code which makes the link sensitive to a triggering event, such as a mouse click. The anchor may be an invisible code labeling a particular point in the target document. Triggering the link makes the part of the target document containing the link's associated anchor the visible portion of the target document. By locating the anchor near the heading corresponding to the link, the heading is made visible when the link is triggered.

At decision block 606, a determination is made whether headings remain in the target document which do not have a corresponding entry in the TOC document. If headings remain, then the "No" branch is followed to block 604 and another entry is created for a remaining heading. If all of the headings in the target document have corresponding entries in the TOC document, the "Yes" branch is followed to decision block 608.

Decision block 608 represents an idle state awaiting the occurrence of an update event. As mentioned above, an update event can be any event which indicates that the TOC document should be recreated, such as the opening of the TOC document, a particular keystroke-combination, or the like. In response to an update event, the "Yes" branch is followed to block 604 and the entries in the TOC document are recreated. In this way, if a change to the target document is made, such as a modification to the text of a heading or the addition of a new heading, the change is reflected in the TOC document.

FIGS. 7A and 7B are logical flow diagrams which, when taken together, depict a flow diagram 700 illustrating in more particularity the steps performed by an exemplary embodiment of the present invention to create a self-updating frameset with a TOC document hyperlinked to sections of a target document. Turning now to the flow diagram 700, a representative target document, such as a document created by the word processing program 37 (FIG. 1), is created. The target document is typically divided into several sections to which a user desires quick access. A heading at the beginning of each section separates that section from other sections. For example, the target document 202 of FIG. 2 includes an "Executive Summary" section introduced by Heading 204, and a "Stock Holders' Equity" section introduced by Heading 206.

In the exemplary embodiment, the target document has been prepared by applying a certain word processing style to each heading. For instance, each heading in the target document may have a "Heading 1" style or a "Heading 2" style applied. As mentioned above, with respect to FIG. 2, a "style" is a configuration of textual format selections, such as font size, typeface, line spacing, or paragraph justification, which can be applied to text in a word processing document.

At decision block 702, the flow diagram 700 awaits a notification that the user desires to create a TOC in a frameset. The notification can be a user input, such as selecting a TOC frameset item from a graphical menu. Alternatively, the notification can be automated. For instance, when saving the target document for the first time, the notification may be automatically generated. When the notification is received, the "Yes" branch is followed from block 702 to block 704.

At block 704, a frameset containing the TOC document and the target document is created. The frameset may include two frames side-by-side and visible in a window of the word processing program 37 (FIG. 1). For example, the frameset 218 illustrated in FIG. 5 includes the TOC document 220 positioned adjacent to the target document 202. Within the structure of the frameset 218, the TOC document 220 is an individual document. Accordingly, the target document 202 occupies one frame and the TOC document 220 occupies another frame in the frameset 218. A frame document, which is not visible to the user, defines the parameters of the frameset. Representative parameters of a frameset include the number and position of the frames and the documents to be included in each frame.

At block 706, a "reference document," or RD, field is inserted into the TOC document. The RD field may be inserted into the TOC document at any appropriate location, such as at the beginning of the TOC document. The RD field defines the document to which the TOC document is hyperlinked and sets a parameter to point to this target document. In the example shown in FIG. 3, the RD field inserted in the TOC document is configured to set a pointer to the target document. In this manner, each time the RD field is recalculated, the parameter is set to point to the target document.

At block 708, a TOC field is inserted into the TOC document. The TOC field is a coded routine that is responsible for generating the entries in the TOC document. Once the TOC field is inserted into the TOC document, the TOC field assumes processing control and performs the remaining steps for generating the TOC. In response to inserting the TOC field into the TOC document at block 708, the AA branch is followed to block 710 (FIG. 7B).

Turning now to FIG. 7B, the TOC field, at block 710, performs the task of scanning the target document to identify the headings. In the disclosed embodiment, scanning the target document includes searching for any text bearing the certain style discussed above. For instance, the TOC field can search for any text in the target document bearing the Heading 1 style or the Heading 2 style. Because the headings to each section of the target document are selected by applying the certain style, the text of each heading is identified by the TOC field as a TOC entry.

At block 712, the TOC field creates a hyperlink in the TOC document associated with each heading. As discussed above, the hyperlink has two components: a "link" and an "anchor." The link is an entry in the TOC document which, when triggered, moves the focus of the target document to the screen of the target document containing the anchor. Those skilled in the art will understand that triggering the link may be performed by using a mouse to place the cursor proximate to the link and depressing a mouse button, i.e. "clicking on the link," thereby activating the link.

At block 714, the TOC field inserts a bookmark in the target document corresponding with each link in the TOC document. The bookmark operates as an anchor to its corresponding link in the TOC document. The bookmark is located near the selected heading in the target document but is preferably not visible. Once the bookmark has been inserted in the target document, the hyperlink is complete. Triggering the link in the TOC document causes the focus of the target document to move to the screen containing the anchor (the bookmark).

At decision block 716, a determination is made whether all of the selected headings in the target document have been linked to the TOC document. If not, then the flow diagram 700 returns to block 712 and the TOC field creates the next hyperlink. The TOC field preferably continues creating hyperlinks between the TOC document and the target document until all of the selected headings in the target document have a corresponding entry in the TOC document. Once complete, the flow diagram 700 proceeds from decision block 716 to decision block 718.

At decision block 718, the flow diagram 700 is idle until an update event occurs. Those skilled in the art will appreciate that computer documents can be configured to recalculate fields in response to many different circumstances. For instance, a field is commonly first calculated when the field is instantiated. Thereafter, the field is recalculated in response to some external event, such as each time the computer document is opened or printed. In the disclosed embodiment, recalculation of the TOC field may occur in several ways. For instance, a manual event may cause recalculation, such as a particular key-stroke combination. Also, recalculation may be automatic, such as each time the TOC document is opened. In any event, when an update event is detected, the Yes branch is followed from decision block 718 to block 710. In this way, a change made in the target document, such as modifying, deleting, or moving a selected heading, will be reflected in the TOC document without the user having to manually modify the entries in the TOC document.

In summary, it will be appreciated that the present invention provides a mechanism for creating a self-updating frameset having a set of frames containing a TOC document hyperlinked to a target document. A TOC document can be created within a frameset. An RD field can be inserted into the TOC document to identify the target document as the document to be linked to the TOC document. A TOC field is also inserted into the TOC document. The TOC field scans the target document to identify selected headings to include as entries in the TOC document. In response to identifying the selected headings, the TOC field creates hyperlink entries in the TOC document. Each hyperlink entry has a corresponding anchor at a selected heading in the target document. Hyperlink entries in the TOC document can be automatically updated each time the fields in the TOC document are recalculated. In this manner, the need to manually update hyperlinks between two documents in an HTML frameset is eliminated.

From a reading of the description above pertaining to the disclosed embodiments of the present invention, modifications and variations thereto may become apparent to those skilled in the art. Therefore, the scope of the present invention is to be limited only by the following appended claims.

What is claimed is:

1. A method for creating a frameset that includes a table-of-contents ("TOC") linked to a directly editable target document, comprising:

in response to a user input, creating the frameset that includes a TOC document in a first frame and the target document in a second frame, wherein the TOC document and the target document are different documents; wherein at least a portion of the TOC document and at least a portion of the target document are simultaneously visible within the frameset; wherein the TOC document is the entire table of contents for the target document that is included in the first frame and the target document is the entire target document that is included within the second frame; wherein the frameset is self-updating such that changes to the target document are automatically reflected within the TOC document;

creating a first entry in the TOC document that includes a first link to a first selected part of the target document; wherein the first entry in the TOC document is created in response to the first selected part of the target document;

presenting at least a portion of the first selected part of the target document when the first link is selected;

creating a second entry in the TOC document that includes a second link to a second selected part of the target document; wherein the second entry in the TOC document is created in response to the second selected part of the target document; and wherein the first and second select parts are within the same target document;

presenting at least a portion of the second selected part of the target document when the second link is selected; wherein the first selected part and the second selected part of the target document are non-contiguous parts of the same document; and automatically updating at least one of the entries in the TOC document at identified times in response to an occurrence of an update event; wherein the update event comprises one or more events including a printing of the TOC document.

2. The method of claim 1, wherein an edit to the target document causes the TOC to automatically recalculate.

3. The method of claim 1, wherein creating the frameset comprises creating a frameset document defining parameters for the frameset including a first unique parameter for identifying a number of frames in the frameset and a second unique parameter identifying the TOC document and the target document to include in the frameset.

4. The method of claim 1, further comprising inserting a reference document field in the TOC document, wherein the reference document field is operative to set a pointer to the target document that identifies the target document as a document to be linked to the TOC document.

5. The method of claim 1, further comprising: inserting a TOC field in the TOC document, wherein the TOC field is operative to perform tasks related to creating the first entry and creating the second entry in the TOC document.

6. The method of claim 5, wherein the tasks related to creating the first entry in the TOC document and creating the second entry in the TOC document comprise scanning the target document to locate the first selected part for inclusion as the first entry in the TOC document and the second selected part for inclusion as the second entry in the TOC document.

7. The method of claim 6, wherein scanning the target document comprises searching the target document for an item having a style representing a particular format selection.

8. The method of claim 7, wherein creating the first entry in the TOC document and creating the second entry in the TOC document comprises:

inserting the first link in the TOC document, wherein the first link includes a parameter identifying first anchor for the first link and corresponds to the first selected part of the target document;

inserting the second link in the TOC document, wherein the second link includes a parameter identifying a second anchor for the second link and corresponds to the second selected part of the target document;

inserting the first anchor in the target document at a location proximate to the first selected part of the target document; and inserting the second anchor in the target document at a location proximate to the second selected part of the target document.

9. The method of claim 1, wherein creating the first entry in the TOC document comprises:

inserting the first link in the TOC document, wherein the first link includes a parameter identifying an anchor for the first link; and inserting the anchor in the target document at a location proximate to the first selected part of the target document.

10. The method of claim 6, wherein updating the first entry in the TOC document comprises repeating the scanning of the target document to locate the first selected part of the target document in response to an update event.

11. The method of claim 10, wherein the update event comprises opening the TOC document.

12. The method of claim 10, wherein the first selected part of the target document comprises a heading of a section in the target document.

13. The method of claim 1, further comprising saving the frameset in HyperText Markup Language (HTML) format.

14. A computer readable medium having computer executable instructions for creating a hyperlinked table-of-contents in a frameset, comprising:

creating a first frame and a second frame within the frameset, the first frame comprising a TOC document that is created in response to section headings of a target document and the second frame comprising the target document, wherein the TOC document and the target document are different documents; the target document being directly editable and having a first selected heading identifying a first section in the target document and a second selected heading identifying a second section in the target document; wherein the first section and the second section in the target document are non-contiguous sections of the same document; wherein the frameset is self-updating such that changes to the target document are automatically reflected within the TOC document;

scanning the target document to locate the first and second selected headings;

creating a first hyperlink entry in the TOC document that includes a first link that is associated with a first anchor in the target document, wherein the first anchor is positioned proximate to the first selected heading, and wherein triggering the first link causes the target document to reveal at least a portion of the first selected heading in the second frame;

creating a second hyperlink entry in the TOC document that includes a second link that is associated with a second anchor in the target document, wherein the second anchor is positioned proximate to the second selected heading, and wherein triggering the second link causes the target document to reveal at least a portion of the second selected heading in the second frame; and automatically updating the first hyperlink entry in the TOC document in response to an update event without direct manual intervention; wherein the update event comprises printing the TOC document.

15. The computer readable medium of claim 14, wherein the update event is an edit to the first selected heading.

16. The computer readable medium of claim 14, wherein creating the frameset comprises creating a frameset document defining parameters including a first unique parameter for identifying a number of frames in the frameset and a second parameter identifying the TOC document and the target document to include in the frameset.

17. The computer readable medium of claim 14, further comprising: inserting a TOC field in the TOC document prior to scanning the target document, wherein the TOC field is operative to perform tasks related to generating the hyperlinked table-of-contents in the TOC document.

18. The computer readable medium of claim 14, wherein scanning the target document comprises searching the target document to locate the first selected heading, wherein the first selected heading has a particular configuration of textual attributes which differentiates the first selected heading from other text in the target document.

19. The computer readable medium of claim 14, wherein the first link comprises a code embedded within the TOC document which, when triggered, causes the target document to move to a position where the first anchor is visible.

20. The computer readable medium of claim 14, wherein the first anchor comprises a code embedded within the target document proximate to the first selected heading, wherein the code is operative to identify a particular location in the target document.

21. The computer readable medium of claim 14, wherein updating the first hyperlink entry in the TOC document in response to the update event comprises:
scanning the target document;
creating an updated hyperlink entry in the TOC document that includes the change to the first selected heading; and
inserting an anchor for the updated hyperlink entry into the target document.

22. A computer readable medium having computer executable instructions for creating a hyperlinked table-of-contents in a frameset, comprising:
creating the frameset having a TOC document and a target document, the target document being directly editable and including a preselected heading indicating a section in the target document; wherein the TOC documents is created in response to the target document such that the frameset displays both the TOC document and the target document from which the TOC is created; wherein the frameset is self-updating such that changes to the target document are automatically reflected within the TOC document;
inserting a reference document field into the TOC document that is operative to set a pointer to the target document;
inserting a TOC field into the TOC document that is operative to:
scan the target document identified by the pointer to identify the preselected heading,
create a first hyperlink entry in the TOC document that corresponds to the preselected heading, and
insert a bookmark into the target document at a location proximate to the preselected heading, wherein the bookmark is associated with the first hyperlink entry; and
automatically updating the TOC document without direct manual intervention to include a second hyperlink entry in the TOC document that corresponds to a new heading that is newly added to the target document in response to an update event; wherein the update event comprises one or more events comprising printing the TOC document; wherein the first hyperlink and the second hyperlink point to non-contiguous sections of the target document such that the first hyperlink and the second hyperlink point to different sections of the same document; wherein the first hyperlink and the second hyperlink are configured such that when each is selected the target document will scroll to a section of the target document associated with the selected hyperlink.

23. The computer readable medium of claim 22, wherein the update event comprises opening the TOC document.

24. A computer readable medium having an HTML frameset stored thereon, comprising:
a first frame including an editable target document comprising a preselected heading; and
a second frame comprising a TOC document comprising a first hyperlink entry to a first selected part of the target document and a second hyperlink entry to a second selected part, different from the first selected part and non-contiguous with the first part, of the target document such that the first hyperlink entry and the second hyperlink entry point to different parts of the same document; wherein when the first hyperlink entry is triggered it causes at least a portion of the first selected part of the target document and a first anchor in the target document in the first frame to come into focus, the first hyperlink entry capable of being recreated without manual intervention in response to an update event, and when the second hyperlink entry is triggered it causes at least a portion of the second selected part of the target document and a second anchor in the target document in the first frame to come into focus; wherein the first frame and the second frame are displayed simultaneously such that the TOC document is displayed in proximity to the target document from which the TOC is created; wherein the TOC document and the target document are different documents; wherein the second frame is self-updating such that changes to the target document are automatically reflected within the TOC document at identified times in response to an occurrence of an update event; wherein the update event comprises printing the TOC document.

25. The computer readable medium of claim 24, wherein the update event comprises opening the TOC document.

* * * * *